May 8, 1962  W. D. HENDERSON  3,033,421
DISPENSING SYSTEM

Filed June 19, 1959  7 Sheets-Sheet 1

WILLIAM DICK HENDERSON
BY Cushman, Darby & Cushman
ATTORNEYS

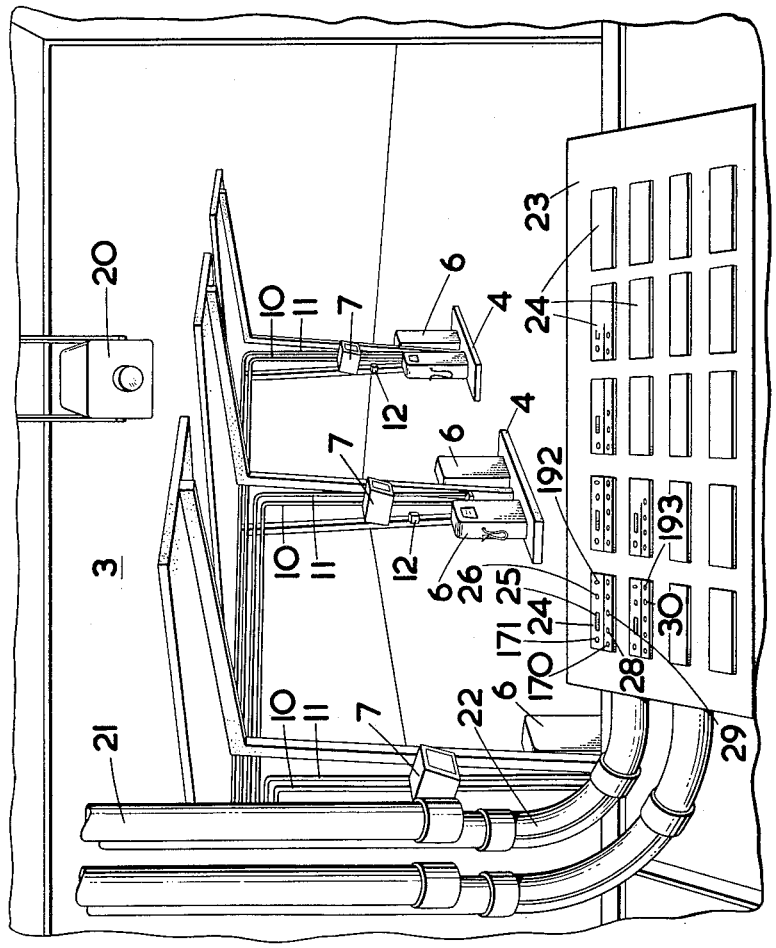

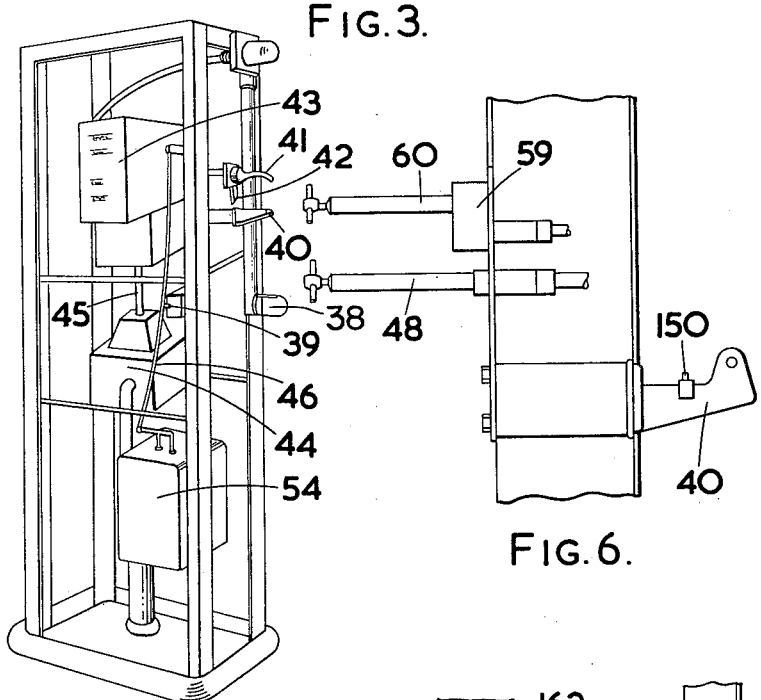
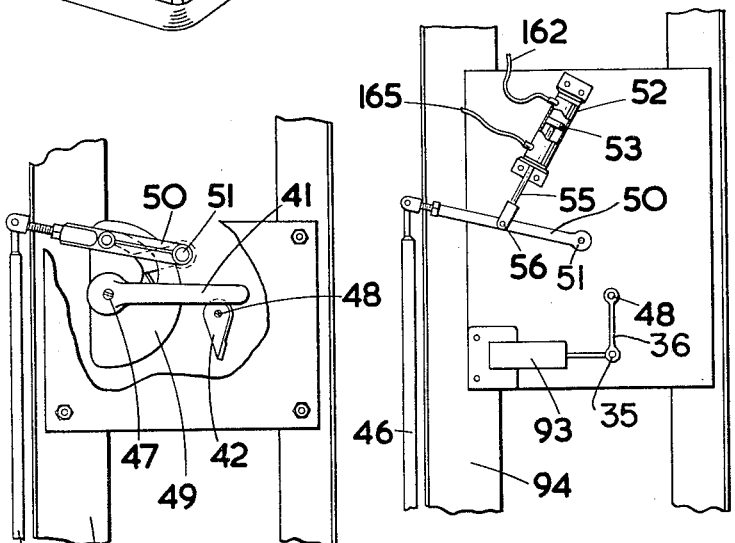

May 8, 1962 W. D. HENDERSON 3,033,421
DISPENSING SYSTEM
Filed June 19, 1959 7 Sheets-Sheet 4
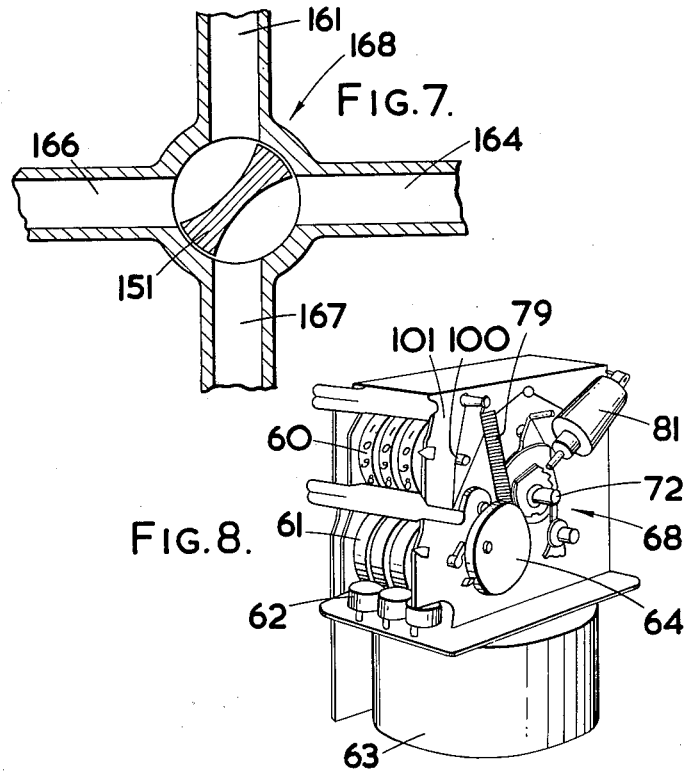
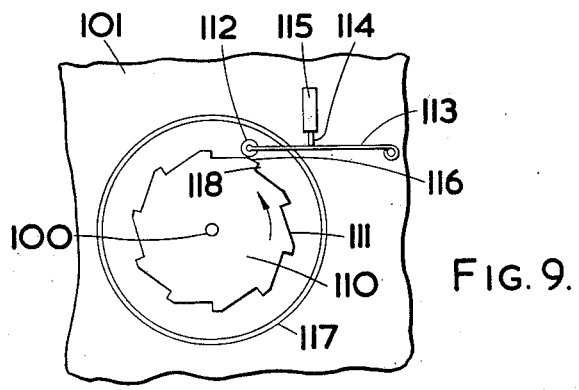
WILLIAM DICK HENDERSON
BY Cushman, Darby & Cushman
ATTORNEYS May 8, 1962

W. D. HENDERSON 3,033,421

DISPENSING SYSTEM

Filed June 19, 1959

WILLIAM DICK HENDERSON

BY: *Cushman, Darby & Cushman*

ATTORNEYS

United States Patent Office 3,033,421
Patented May 8, 1962

3,033,421
DISPENSING SYSTEM
William D. Henderson, 2328 Henderson Highway, R.R. 3, East St. Paul, Winnipeg, Manitoba, Canada
Filed June 19, 1959, Ser. No. 821,452
Claims priority, application Canada Apr. 28, 1959
6 Claims. (Cl. 222—26)

This invention relates to a communication and distribution system for use in automobile service stations and, more particularly, to a system whereby automobile service station customers may serve themselves.

In known systems employed by present day gasoline stations, it is necessary to have each car serviced personally by a station employee. This leads to high running costs and when the number of staff maintained is not sufficient to allow immediate attention, the customer is caused to wait often for seemingly long periods.

I have sought to overcome these draw-backs by replacing this employee service with an appropriate self-service system and have developed a method of permitting the servicing of motor vehicles by making gasoline and if desired, oil, available to the driver of a vehicle in measured quantities. At the same time however, I permit an authoritative member of the station staff to maintain a vigilant knowledge of the quantity of products sold, and to receive the monies required in payment. In the present system I further provide a means for bringing personal contact between the staff member and the customer, to permit the interchange of colloquialisms or questions and instructions. Advertisements may also be presented before the customer in a manner suited to obtaining his acceptance of the product promoted.

In the description of a particular embodiment of the invention which follows, reference will be made to the drawings in which:

FIGURE 2 shows a perspective view from the inside of the tower shown in FIGURE 1.

FIGURE 3 shows a perspective partly simplified view of a typical metering dispensing apparatus.

FIGURE 4 shows a side view of the upper part of the apparatus of FIGURE 3.

FIGURE 5 shows the view of FIGURE 4 in which certain modifications to the apparatus have been effected.

FIGURE 6 shows a partial side view of the upper part of the apparatus of FIGURE 3.

FIGURE 7 shows a diagrammatic view of a four way valve employed in the present invention.

FIGURE 8 shows a perspective view of the computer appearing in FIGURE 3.

FIGURE 9 shows a side view of a modification to the computer of FIGURE 3 and FIGURE 8.

Figure 15:
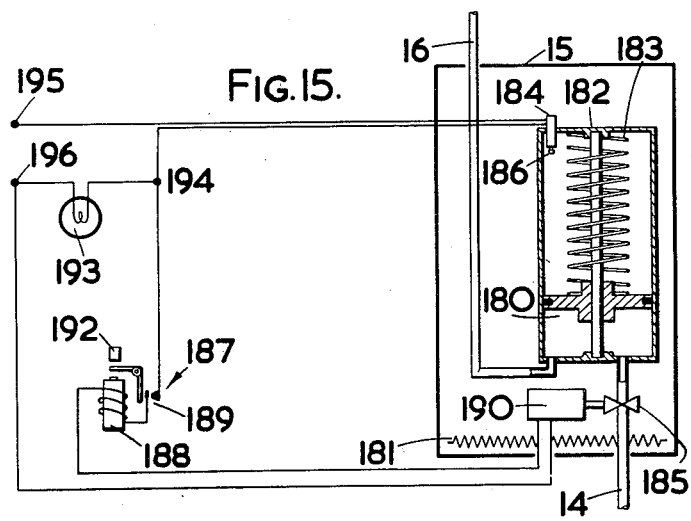

And FIGURE 15 shows a diagrammatic side view in section of an oil metering device and its associated equipment.

Figure 1:
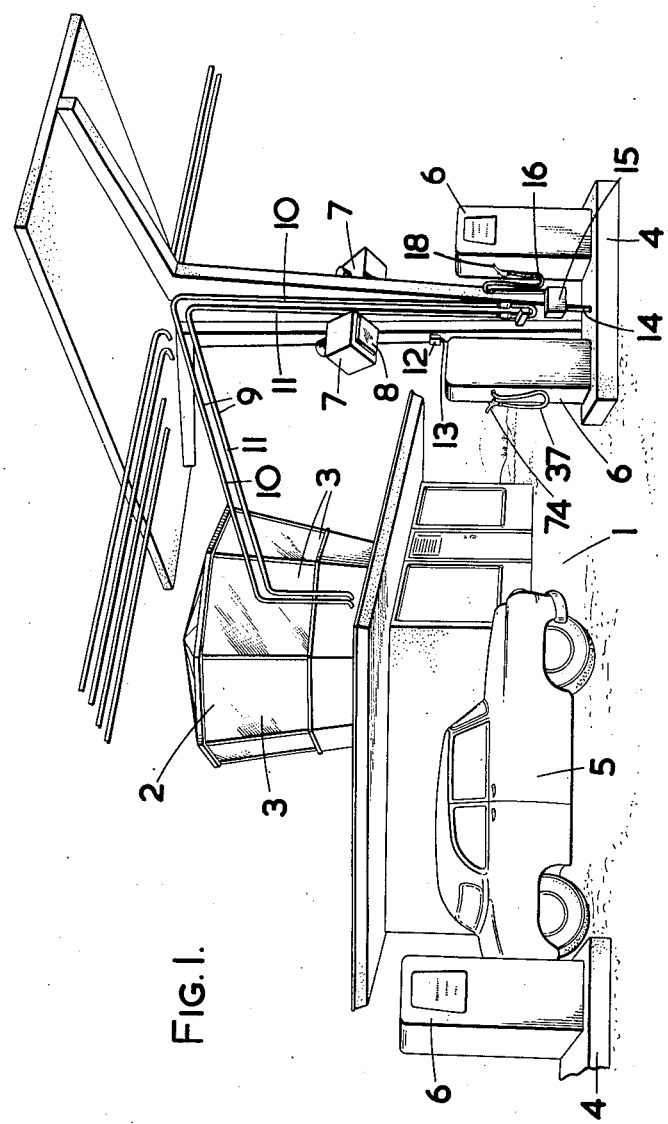
FIGURE 1 shows a general perspective view of a service station constructed in accordance with the present invention.

Having reference first to FIGURE 1, main service area 1 is overlooked by a tower 2 fitted with glass windows 3 through which an operator within the tower 2 can maintain an uninterrupted view of the service area 1. Gasoline dispensing islands 4 are provided at suitably spaced positions. An automobile 5 is shown drawn up beside one of these islands 4, for filling from a dispenser 6. Mounted above each island 4 is a television display apparatus 7 with cathode ray tube 8. Each island is preferably provided with two display devices 7, each one facing to a particular side of the islands for viewing from that side. Air ducts 9 are provided from the tower and a pair of each (one go 10 and one return 11) is led to each island. An intercommunication speaker microphone 12 is also provided adjacent each dispenser 6 having call button 13. Bulk oil if required can be delivered to the island 4 through a pipe 14 (shown here as rising from the ground) with associated metering apparatus 15 to be described later. A nozzle 18 and flexible pipe 16 are provided so that oil may be directed into the filler opening of the automobile motor.

FIGURE 2 shows a typical view from the inside of the tower 2. The dispensers 6, the television display devices 7, and the pneumatic ducts 10, 11 can be seen through window 3.

Camera 20 is provided for obtaining a continuous picture of the operator for the several television receivers 7. This closed circuit television system follows standard practice and will not be discussed further here. Ducts 21 and 22 are duplicated in the tower for each island 4 and connect with ducts 11 and 10 respectively for the island concerned. The ducts enable the operator to receive payment from the island and to return change where necessary. In FIGURE 2 is also shown console 23 with control panels 24, one of which corresponds to each particular dispenser 6. Situated behind each panel 24 is a dial counter 25. Each counter has a reset knob 26. Three lights 28, 29 and 193 are also provided together with a dispenser reset button 30 and intercommunication call button 170, call light 171 and oil reset button 192. The operation of all these will be described later.

Reference to FIGURE 3 shows in simplification, a well known type of dispenser. In the present invention this dispenser is modified so that it is merely necessary for the customer to remove the nozzle from its support, take the gasoline required, replace the nozzle and read the amount of gasoline dispensed or the price on the computer, then pay his money. It is highly desirable that at the same time once the nozzle has been replaced on its supporting bracket, it shall not be possible for another customer to take gasoline, until the computer has been reset to zero. It is desirable too, that this resetting should be carried out by an official of the service station. In a typical dispenser (FIGURE 3) an on-off handle 41 and a reset lever 42 are provided. To start the dispensing action, the energising lever 41 is rotated through 90 degrees to the "on" position, so that its outer end is upright. This opens a foot valve 54 and starts a distant pump via switch 39 to permit flow of gasoline, from union 38 to a dispensing hose 37 (FIGURE 1). At the same time the computer 43 is unlocked and is free to record the flow of gasoline when nozzle 74 (FIGURE 1) is opened. It may in some cases be convenient to place union 38 on a pipe rising from top of the dispenser. This enables the hose 37 to hang from above and it can thus be directed more conveniently for filling an automobile drawn up on either side of an island 4 without careful account by the motorist being taken of the location of his gasoline filler opening when parking the automobile. A particular computer such as the type described here, is sold by the Veeder-Root Company and is designed to be operated by a rotary output metering unit 44 (also standard equipment, well known in the art). The metering unit is connected to computer 43 by shaft 45. In general, the remaining equipment in the dispensing unit, will be exactly similar to that in general use and will employ an air bell or other air eliminating system for the removal of any bubbles in the fuel before metering. Reference to FIGURE 4 shows the on-off handle 41 and in detail the way in which it enables the foot valve 54 to be opened and switch 39 to be thrown by link rod 46, as slotted cam 49 affixed to shaft 47 is rotated. Shaft 47 on which handle 41 is mounted passes into the computer and unlocks it in a manner which will be described later. Shaft 48 on which reset lever 42 is affixed also passes into the computer and its co-operation with this will also be described later.

One way in which the standard pump just described is converted for automatic customer use, is shown in FIGURE 5. Slotted cam 49 and handle 41 are removed from shaft 47. Pitman arm 50 is then coupled at pin 56 to the connecting rod 55 of a piston 53 acting in a cylinder 52. Reset lever 42 is replaced by an arm 36 connected to a solenoid assembly 93 at pin 35 for remote operation. The solenoid 93 is fastened to one of the uprights 94 of the dispensing mechanism, so that when the solenoid is energised, shaft 48 is rotated.

In FIGURE 6 can be seen a spring loaded plunger 150. This plunger is coupled by suitable means (not shown) to operate the selector member 151 of a four way valve 168 shown diagrammatically in FIGURE 7. Conduit 161 is connected to an air pressure line, and conduits 164 and 166 are respectively connected to inlets 162 and 165 of casing 52 (in FIGURE 5). Exhaust 167 is vented to atmosphere.

Computer 43 is shown in greater detail in FIGURE 8. Here can be seen, the price wheels 60, fluid measure wheels 61 and price setting indicators 62. The variator mechanism for relating price and volume which is contained within housing 63 follows normal practice, and will not be discussed further. Bell 64 is included for indicating each separate volume unit delivered. It will be seen that there is a shaft 100 protruding beyond the side 101 of the computer 43, this shaft provides an axle for price wheels 60 and is directly connected to the wheel, showing the last significant figure of the price of the dispensed fuel. For the decimal system of coinage in use in North America, this will be the cent wheel. This shaft 100 now is extended either by welding or fitting an extension piece onto it. On this extension piece is mounted a star wheel 110 (see FIGURE 9). Bearing on the rim 111 of wheel 110 is a roller 112 affixed for rotation on the end of a spring leaf arm 113. The button 114 of a restricted movement two-state press switch 115 rests against leaf 113 and is adjusted to switch its contacts from one position to the other as roller 112 is raised by high point 116 of wheel 110. The switch 115 should be adapted so that only a small movement of its button 114 is required for switching purposes and one of the type known as a "microswitch" is suitable. A rebound ring 117 is provided encircling rim 111 of wheel 110 to prevent excessive movement of arm 113 or skipping when gasoline is being withdrawn at a rapid rate. In practice it is preferable to place a spring coupling between wheel 110 and shaft 100 to ensure that the wheel does not stop exactly on one of its peaks 116 thereby keeping button 114 depressed with consequent damage to counter 128 (described later). By flattening the peaks 116 the wheel tends to turn sufficiently for roller 112 to drop into a following trough 118. The number of points 116 on the star wheel 110 will normally be arranged to be the same as the number of separate integers shown on the last significant figure wheel.

Figure 10:
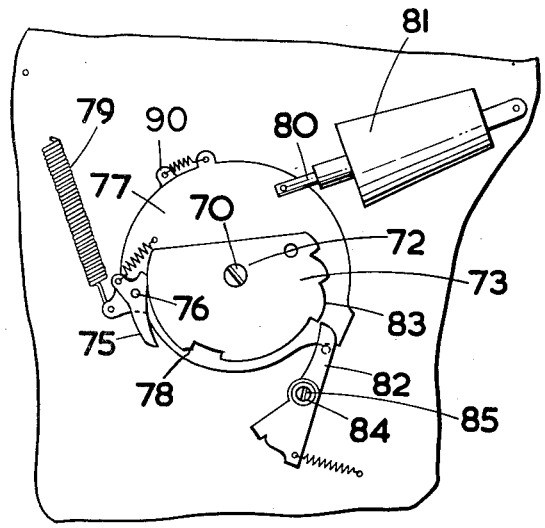
FIGURES 10, 11, 12 and 13 show side views of the successive operation of the computer reset mechanism.
Figure 11:
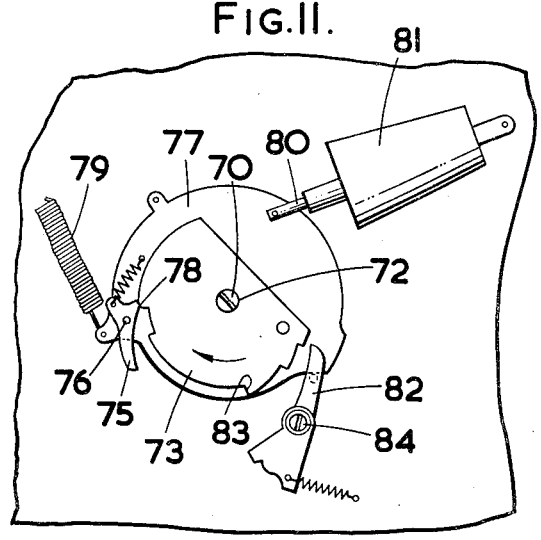
Figure 12:
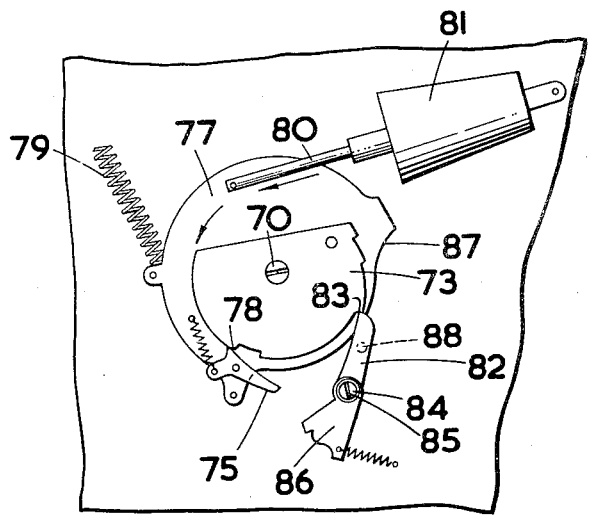
Figure 13:
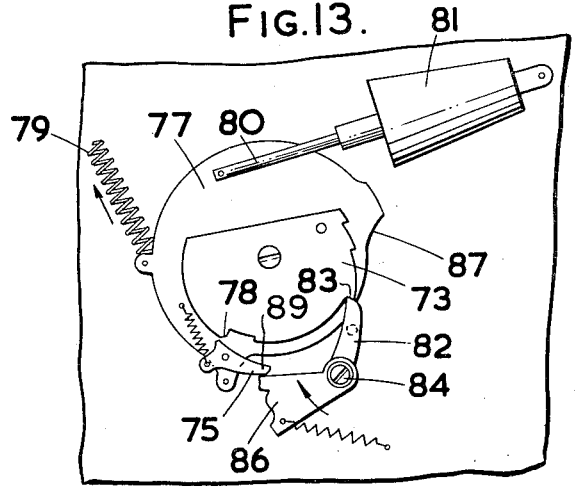

Reference will now be made to FIGURES 10, 11, 12 and 13 which show the "locking" and reset mechanism on the computer 43. This mechanism can be seen generally at 68 in FIGURE 8. FIGURE 10 shows the position of the mechanism 68 when the dispenser 6 is ready for use. In the modified dispenser, when the nozzle is removed from parking bracket 40, plunger 150 rises (see FIGURE 6), and by rotation of control member 151 in air valve 168 air is admitted to inlet 162 of cylinder 52, thereby driving piston rod 55 downwards, moving pitman 50 and rotating axle 51. This rotation of shaft 51 is transmitted via reversing gear 59 and shaft 60 to socket 70 of shaft 72. The rotation of shaft 72 moves ratchet cam 73 from the position of FIGURE 10 to that of FIGURE 11. This rotation of shaft 72 also unlocks the computer wheels (by means not shown) and allows the device to register the flow of fuel. The movement of pitman 50 has of course, through the medium of rod 46 opened the foot valve 54 and thrown switch 39, thereby energising the dispenser. Fuel can therefore flow as desired, controlled by the opening and closing of the nozzle 74. When the required amount of gasoline has been delivered the nozzle 74 is replaced. This depresses plunger 150 and hence rotates member 151 through 90°, admitting air to inlet 165 of cylinder 52 connecting inlet 162 to exhaust and whence raising pitman 50. Movement of pitman 50 closes foot valve 54, and switch 39 and rotates shaft 72 and cam 73 from the position of FIGURE 11 into that of FIGURE 12. It will be seen that in moving to this position the ratchet pawl 75 mounted on a pivot 76 held by cam member 77, engages against shoulder 78 of cam 73. As cam 77 is rotated to the position of FIGURE 12 spring 79 attached to cam 77 is tensioned. This movement also withdraws the plunger 80 from air dash-pot 81 and of course locks the computer wheels. In the position of FIGURE 12 ratchet pawl 82 is permitted under the action of a spring (not shown) to contact against shoulder 83 of cam 73. (In the position of FIGURES 10 and 11, pawl 82 is held away from cam 73 by the co-operation of pin 88 against surface 87). It can now be seen that if the shaft 72 is again attempted to be turned back to the position of FIGURE 11, as for instance should another customer try to obtain gasoline, the engagement of shoulder 83 against pawl 82 prevents this from taking place. It will be clear therefore that in the position of FIGURE 12 the computer is locked and the foot valve 54 cannot again be opened.

In order to render the device again operative, the reset mechanism must be tripped. To accomplish this, shaft 84 which is connected by engagement in slot 85 to shaft 48, is rotated into the position shown in FIGURE 13. This rotation causes trigger 86 to lift the lower end 89 of pawl 75, thereby releasing ratchet cam 77. Under the action of spring 79 cam 77 is returned from that of FIGURE 13 to the position of FIGURE 10 being arrested in its rotation by the progressive opposition of plunger 80 in re-entering dash-pot 81. The rear portion of cam 77 is fitted with gear teeth (not shown) and in a known manner rewinds the dials of the computer resetting them to zero. This can be achieved although the dials are locked since they are only held under relative firm frictional pressure. The gear mechanism behind cam 77 is fitted with a ratchet, one end 90 of which can be seen in FIGURE 10 so that rotation of the gear only takes place when cam 77 turns clockwise. It will be realised that the pressure of air for the air cylinder 52 should be adjusted so that should nozzle 74 again be removed before the dispenser has been reset no damage can be caused to the mechanism 68 by excessive load in piston rod 55. It will be appreciated too, that, if desired, air cylinder 52 could be replaced by an electrically operated solenoid, and plunger 150 by a "micro" switch for operating the solenoid when nozzle 74 is removed from bracket 40. Air operation is preferred, however, for economical reasons and because the force on piston rod 55 remains constant throughout the distance of travel of piston 53, whereas a solenoid may require compensation so that it has sufficient thrust at one end of its travel without excessive thrust at the other.

Figure 14:
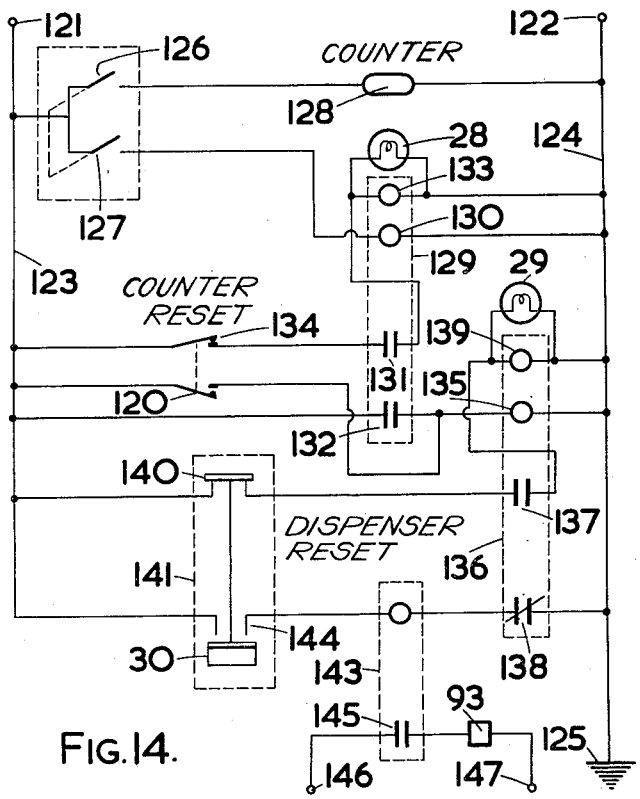
FIGURE 14 shows a schematic diagram of the circuit associated with the remote reading console of FIGURE 2.

In FIGURE 14 there is shown the circuit for operating the remote reading and reset system from the tower 2. Terminals 121 and 122 are connected to a source of current suitably 24 volts A.C. The two terminals supply bus bars 123 and 124 one of the bars being grounded at point 125. Contacts 126 and 127 are contained within micro switch 115, and are closed each time the roller 112 passes over a peak 116 of the star wheel 110. Contacts 126 are connected in series with an impulse counter 128 between bus bars 123 and 124. The counter 128 may be any suitable form of known impulse operated device and will normally carry the same number of digit wheels beneath window 24 (FIGURE 2) as the gasoline price wheels in the computer 43. The last digit wheel on the counter 128 visible on panel 24 is thus arranged to revolve in synchronism with the shaft 100 (in FIGURE 8). On the first closing of contacts 127 current is passed through winding 130 of relay 129 and causes the making of contacts 131 and 132. Contacts 132 are bridged by a normally open switch 120. The closing of contacts 131 allows current to pass through normally closed switch 134 and winding 133 thereby holding relay 129 closed independently of winding 130, winding 133 is bridged by a lamp 28. It will be clear therefore that relay 129 closes as soon as gasoline starts to be delivered and remains closed until the circuit through winding 133 is broken by opening switch 134, during this period lamp 28 is illuminated. The making of contact 132 passes current through winding 135 of relay 136 and in turn causes closing of contacts 137 and opening of contacts 138. The closing of contact 137 permits current to flow through winding 139 and normally closed contacts 140 of a press switch 141. This current holds relay 136 closed independently of winding 135. Lamp 29 of FIGURE 2 is connected across winding 139. The winding 142 of relay 143 is series connected across the bus bars 123 and 124 through the normally closed contacts 138 of relay 136 and contacts 144 of a switch 141. As long as relay 136 remains actuated, closing of contacts 144 does not permit operation of relay 143. Relay 136 in turn remains actuated even if contacts 140 are opened because of the holding of contacts 132 in relay 129. It will be seen therefore, that to operate relay 143 by switch 141 it is necessary that relay 129 be first released. Relay 143 has contacts 145 connected in series with the winding of the solenoid 93 shown in FIGURE 5. Switch 141 is operated by button 30 of FIGURE 2. Terminals 146 and 147 are fed from a suitable source of voltage determined by the working characteristics of relay 93.

*Operation*

When the customer removes the nozzle 74 from the parking bracket 40 plunger 150 rises and turns the four way valve 168 so that connecting rod 53 is ejected towards the base of cylinder 52, this opens the foot valve 54, throws switch 39, and unlocks the computer by moving the ratchet mechanism to the position of FIGURE 11 so that delivery of fuel can commence when the release valve on handle 74 is squeezed.

Whilst gasoline is flowing into the consumer's tank, counter 128 records in synchronism with the price wheels in the dispenser 6. The first closing of contacts 127 has closed relays 129 and 136, has illuminated lamps 28 and 29, rendering it impossible to actuate relay 143 and solenoid 93 by pressing button 30. When delivery of fuel is complete, the price will be shown on dials 25 as well as on the dispenser 6 and the customer can then place the exact amount of money in one of the carriers 15 (see FIGURE 2) of the pneumatic line system, into the pipe 11. Change is returned to him through pipe 10 by the operator in tower 2. During this time the operator in the tower will wish to speak to the customer and to do this he will press a button such as 170 for connecting his microphone (not shown) to the loud speaker on the island 4 at which the customer is situated. The customer is able to call the operator independently by pressing button 13 (FIGURE 1) which lights lamp 171 on panel 24 at the same time he will watch the picture on tube 8 and see advertisements place behind the operator. When the customer's change has been returned to him, the operator will reset his counter by means of wheel 26. In so doing, the switch 134 is opened by a trip pawl on wheel 26 thereby releasing relay 129 and extinguishing light 28. The operator then depresses button 30 which can now release relay 136 and permit the operation of relay 143. In so doing, solenoid 93 is energised and the reset mechanism springs from the position of FIGURE 13 to that of FIGURE 10. At the same time, the indicating wheels on the dispenser are returned to zero and gasoline is once more permitted to be delivered when the nozzle 74 is removed from bracket 40 and when the mechanism once again takes up the position of FIGURE 11. The opening of switch 134 is accompanied by the closing of switch 120 directly coupled to it and prevents operation of the dispenser reset mechanism until the counter 128 has been completely reset.

In some instances it may be desirable to supply bulk oil to each island 4 through a metering device 15. Meter 15 conveniently comprises a system such as shown diagrammatically in FIGURE 15 wherein oil is led through pipe 14 to the underside of a piston. The piston 180 is mounted for movement in a cylinder 182 under the action of a spring 183. Oil is supplied under pressure by any suitable known pumping means to force the piston up to the top of the cylinder. As piston 180 reaches the top of cylinder 182 it is arranged to trip the plunger of 186 a "micro" switch 184. A solenoid operated valve 185 is provided in supply pipe 14 which closes when the solenoid 190 is de-energized. When a customer requires oil, discharge nozzle 17 at the end of pipe 16 (see also FIGURE 1) is opened and oil is forced through pipe 16 by the action of spring 183 on piston 180. The switch 184 is series connected with normally open contacts 189 of a relay, and thence to one side of winding 188 of relay 187. Relay 187 is mounted below panel 24 (FIGURE 2) and is provided with an armature operating push button 192. The other side of winding 188 connects to solenoid 190. The series combination of switch 184 relay 187 and solenoid 190 is fed from suitable source of voltage at terminals 195 and 196. A measure of oil can therefore be passed into cylinder 182 only if switch 184 is closed and button 192 is pressed. As soon as piston 180 strikes button 186, valve 185 shuts and relay 187 releases. Valve 185 cannot therefore be reopened until button 192 is again depressed by the operator in the tower 2. A lamp 193 is conveniently if desired, mounted in the panel 24 and connected between point 194 and terminal 196, to indicate to the operator whether piston 180 is resting against button 186. Illumination of this bulb will imply that the customer has taken a measure of oil. In very cold weather, it may be necessary to include a heater coil 181 in compartment 15 to ensure that the oil flows freely.

I claim:
1. A customer self-service liquid dispensing system including a plurality of dispensers, each dispenser comprising, a metering device for the quantity of liquid delivered by said dispenser, a computer for said metering device the computer and the metering device being operatively connected, a reset mechanism for said computer, means for energising the dispenser for delivering liquid including an operating shaft, interlock means interconnecting said shaft and said reset mechanism for preventing operation of said energising means after an initial operation of said energising means until said computer has been reset by operating said reset mechanism, an impulse generator for generating electrical impulses in accordance with movement of said computer as liquid is delivered, an impulse counter for each dispenser at a communal point remote from all said dispensers for counting and displaying a reading in accordance with impulses received from each said generator, and operative means at said communal point for resetting each said computer individually to permit operation of its associated energising means.

2. The system as defined in claim 1 wherein said computer includes a last digit wheel and a shaft for driving said wheel, a star wheel associated with said digit wheel shaft for driving in synchronism with said digit wheel, peaks on said star wheel, a two-state switch including an operating button, said button being arranged to cooperate with said peaks to alter the state of said switch as each said peak passes through a given point, said counter being operative to count the number of times said switch is moved from a chosen one of its two states to the other.

3. The system as defined in claim 2 wherein said impulse generator includes a spring leaf rigidly fixed at one end, a roller on said spring for engaging said star wheel, said button being arranged to engage said leaf for movement of said button as said roller passes over each of said peaks.

4. The system as defined in claim 3 wherein each said peak is flattened and a rebound ring surrounding said star wheel for preventing excessive movement of said leaf.

5. The system as defined in claim 3 wherein said digit wheel shows ten digits and said star wheel has ten peaks.

6. A customer self-service liquid dispensing system which comprises a plurality of dispensers, each dispenser including, means for energising said dispenser for dispensing liquid, a metering device for liquid dispensed, a computer for each said metering device, reset means for each said computer operable from a communal remote point, switch means operable by said computer for generating impulses in accordance with the reading of said computer, a counter at said remote point for said impulses for providing a reading proportional to the number of impulses generated by said generating means, a first relay operable to become energised upon generation of an impulse from said generator means, a second relay operable to become energised upon, and to remain energised during, energisation of said first relay, second relay release means for releasing said second relay when said first relay is energised, computer reset operating means, said release means being interconnected with said second relay and said reset operating means to operate said reset means when said release means can deenergise said second relay, and interlock means operatively connected between said computer and said energising means for permitting operation of said energizing means, following an initial operation of said energising means, only after said reset means has reset said computer.

References Cited in the file of this patent

UNITED STATES PATENTS

| | | |
|---|---|---|
| 2,510,093 | Ferguson et al. | June 6, 1950 |
| 2,612,288 | Hazard | Sept. 30, 1952 |
| 2,652,948 | Moore et al. | Sept. 22, 1953 |
| 2,820,574 | Harr | Jan. 21, 1958 |
| 2,935,229 | Robinson | May 3, 1960 |